United States Patent [19]
Bertin et al.

[11] Patent Number: 5,955,818
[45] Date of Patent: Sep. 21, 1999

[54] MACHINE STRUCTURES FABRICATED OF MULTIPLE MICROSTRUCTURE LAYERS

[75] Inventors: Claude Louis Bertin, South Burlington; John Edward Cronin, Milton, both of Vt.

[73] Assignee: International Business Machines Corporation, Armonk, N.Y.

[21] Appl. No.: 08/999,871

[22] Filed: Nov. 4, 1997

Related U.S. Application Data

[63] Continuation of application No. 08/510,924, Aug. 3, 1995, abandoned.

[51] Int. Cl.$^6$ .................................................. H01L 41/08
[52] U.S. Cl. ........................ 310/309; 310/306; 310/308; 310/40 MM; 216/33
[58] Field of Search .................................... 310/308, 309, 310/306, 89, 91, 40 MM; 216/33, 2, 67, 99; 29/598, 596; 428/133, 131, 134, 137, 138, 139, 174, 597, 603

[56] References Cited

U.S. PATENT DOCUMENTS

| | | | |
|---|---|---|---|
| 4,740,410 | 4/1988 | Muller et al. | 428/133 |
| 4,761,210 | 8/1988 | Ehrler et al. | 204/129.65 |
| 4,893,042 | 1/1990 | Tamaka | 310/216 |
| 4,928,029 | 5/1990 | Wright | 310/89 |
| 4,943,750 | 7/1990 | Howe et al. | 310/309 |
| 4,997,521 | 3/1991 | Howe et al. | 156/651 |
| 5,001,381 | 3/1991 | Watanabe | 310/309 |
| 5,202,754 | 4/1993 | Bertin et al. | 257/684 |
| 5,266,859 | 11/1993 | Stanley | 310/216 |
| 5,270,261 | 12/1993 | Bertin et al. | 437/209 |
| 5,315,751 | 5/1994 | Hammer | 29/598 |
| 5,426,566 | 6/1995 | Beilstein, Jr. et al. | 361/735 |
| 5,493,156 | 2/1996 | Okada | 310/40 MM |
| 5,576,147 | 11/1996 | Guckel et al. | 430/313 |
| 5,649,349 | 7/1997 | Greenway | 29/598 |
| 5,710,466 | 1/1998 | Allen et al. | 310/40 MM |

FOREIGN PATENT DOCUMENTS

| | | |
|---|---|---|
| 0 619 642 A2 | 3/1994 | European Pat. Off. . |
| 40 03 116 A1 | 8/1991 | Germany . |
| 44 00 315 C1 | 12/1995 | Germany . |
| 3-22885 | 1/1991 | Japan . |
| 5-64464 | 3/1993 | Japan . |

OTHER PUBLICATIONS

Witek, K.E., et al., "A Method For Assembling Micromechanical Devices Using One of Magnetic Field Or Liquid Surface Tension", Jul. 1995, Motorola Technical Developments, pp. 97–104.

Harmening, M., et al., "Molding of Threedimensional Microstructures By The LIGA Process", 1992 IEEE Catalog No. 92CH3093–2, Micro Electro Mechanical Systems, '92, pp. 202–207.

Jacobsen, S. C., et al., "A Design Overview of an Eccentric–motion Electrostatic Microactuator (the Wobble Motor)", Nov. 15, 1989, 8253 Sensors and Actuators/Elsevier Sequoia, pp. 1–16.

(List continued on next page.)

*Primary Examiner*—Nestor Ramirez
*Assistant Examiner*—Tran N Nguyen
*Attorney, Agent, or Firm*—Heslin & Rothenberg, P.C.

[57] ABSTRACT

Machine structures each comprising a stack of a plurality of micromachine layers laminated together are presented, along with fabrication methods therefore. Each machine structure includes a movable member(s) defined from microstructure of at least one layer of the plurality of micromachine layers comprising the stack. During fabrication, the micromachine layers are separately formed using VLSI techniques and then subsequently laminated together in a selected arrangement in the stack to define the machine structure.

15 Claims, 3 Drawing Sheets

OTHER PUBLICATIONS

Ogura, H., et al., "A Concentric Build–up Process to Fabricate Practical Wobble Motors", Jan. 25, 1994, Matsushita Research Institute Tokyo, Inc., pp. 114–118.

Suhir, E., "Double–Sided "Velcro–Type" Input/Output Contactor Interface Design: Mechanical Behavior of Elastic Contactors," Journal of Electronic Packaging, vol. 112, pp. 383–386, Dec. 1990.

Han et al., "A Mchanical Surface Adhesive Using Micromachined Silicon Structures," J. Micromech. Microeng. 1, pp. 30–33, 1991.

Uzoh, C. E., "Accelerated Etching of Silicon in Anisotropic Ethylene Diamine–Water–Pyrazine–Pyrocathecol Bath," IBM Technical Disclosure Bulletin, vol. 31, No. 7, pp. 420–422, Dec. 1988.

Lehr, H., et al., "LIGA components for the construction of milliactuators," 1994 IEEE Symposium on Emerging Technologies and Factory Automation, pp. 43–47, Nov. 1994.

"Integrated Notched Pin Joint and other Multilayer Structures with Extended High–Aspect Ratio Gaps and Method of Fabrication Thereof," IBM Tech. Discl. Bulletin, vol. 38, No. 04, Apr. 1995, pp. 593–596.

5,955,818

MACHINE STRUCTURES FABRICATED OF MULTIPLE MICROSTRUCTURE LAYERS

This application is a continuation of application Ser. No. 08/510,924, filed Aug. 3, 1995, now abandoned.

TECHNICAL FIELD

This invention relates in general to the fabrication of machine structures, and in particular, to the fabrication of a machine comprising multiple layers of microstructures separately formed and subsequently laminated together in a selected stack arrangement to form the machine.

BACKGROUND ART

Although micromachine technology continues to rapidly expand, such machines have in practice typically been employed only as microsensors. For example, there are silicon microsensor chips that sense mechanical vibrations to establish acceleration, and there are other microsensors, known as silicon diaphragm pressure sensors, which measure pressure. Chemical sensors have also been fabricated on silicon substrates to sense ion concentration, dielectric properties of materials, organic vapor concentrations and gas concentration, etc.

Most microstructures, such as diaphragms and microbridges, have been structures with relatively immovable elements or members. Recently, however, micromachine technology has extended to the fabrication of microactuators having moving members; for example, reference U.S. Pat. Nos. 4,943,750 and 4,997,521, both of which are entitled "Electrostatic Micromotor."

Using basic silicon technology, numerous movable microobjects fashioned as machines can be fabricated on a silicon substrate. These micromachines are composed of microstructures defined on a single substrate using conventional large-scale integration (LSI) or very-large-scale integration (VLSI) processing. Unfortunately, a significant disadvantage of existing micromachines is that the devices are so small, practical uses are few. For example, an electrostatic motor 1 micrometer by 0.1 micrometer cannot drive anything, except perhaps other micromachine gears.

Thus, presented herein is a novel extension of existing micromachine technology that seeks practical implementations for such technology. A goal of the present invention is to provide machines capable of useful work that are fabricated with micromachine technology, but are much larger than otherwise practical with such technology.

DISCLOSURE OF INVENTION

Briefly summarized, in a principal aspect the present invention sets forth a machine comprising a stack structure formed of a plurality of layers laminated together. The stack structure includes a movable member defined from microstructure of at least one of the layers comprising the plurality of layers in the stack. As a specific example, the machine can comprise an electrostatic motor, with the stack including a stator structure and a rotor structure positioned for movement relative to the stator structure, free of contact therewith. The rotor structure is defined from microstructure of at least one micromachine layer in the plurality of layers comprising the stack.

In another aspect, the invention comprises a method for fabricating a machine which includes the steps of: providing a plurality of substrates; forming at least one opening in at least one substrate, the at least one opening defining structures in the at least one substrate; filling at least some of the at least one opening with a sacrificial material for temporarily securing together selected structures separated by the at least one opening; stacking the plurality of substrates together in a selected arrangement to form a stack structure; and removing the sacrificial material from the at least one opening such that structures defined in the substrate by said opening comprise a movable member within said stack structure, thereby forming the machine.

In another aspect, a method is set forth for fabricating a machine that includes: forming at least one opening in each of at least two substrates, the openings defining microstructures in the substrates that create the machine when the substrates are stacked in a selected arrangement; filling at least some of the openings in the substrates with a sacrificial material for temporarily securing together selected microstructures separated by the openings; stacking the substrates together in the selected arrangement, thereby forming a stack; and removing the sacrificial material from the openings in the substrates, wherein a movable member is defined within the stack by stacked microstructures of the at least two substrates forming the stack, thereby forming the machine.

Although described herein with reference to an electrostatic machine, and in particular, an electrostatic motor, those skilled in the art should understand that the concepts presented are equally applicable to the fabrication of a wide variety of machines having one or more movable members. Conceptually, the invention employs a series of masks to define layers or slices on substrates or a wafer to be subsequently assembled in a selected arrangement to form a stack which comprises the machine. Sacrificial layers temporarily hold the movable member(s) within the layers until stacking is achieved. By fabricating a machine as a stack, machines with dimensions from micrometers to millimeters to centimeters can be achieved. Essentially, the concepts presented allow the fabrication of machines sized to fill the existing gap between macro (centimeters) and micro sized machines.

Again, a wide variety of machines can be constructed using the techniques presented herein. For example, the individual layers of the stack may each contain different micromachine structures, or if containing the same structures, those structures may be sized and/or shaped differently. For example, a pear-shaped rotor could be readily envisioned and constructed using the layering approach presented herein. There are few limits on what can be done employing the basic concepts of the invention presented.

BRIEF DESCRIPTION OF THE DRAWINGS

These and other objects, advantages and features of the present invention will be more readily understood from the following detailed description of certain preferred embodiments of the invention, when considered in conjunction with the accompanying drawings in which.

BEST MODE FOR CARRYING OUT THE INVENTION

Figure 1:
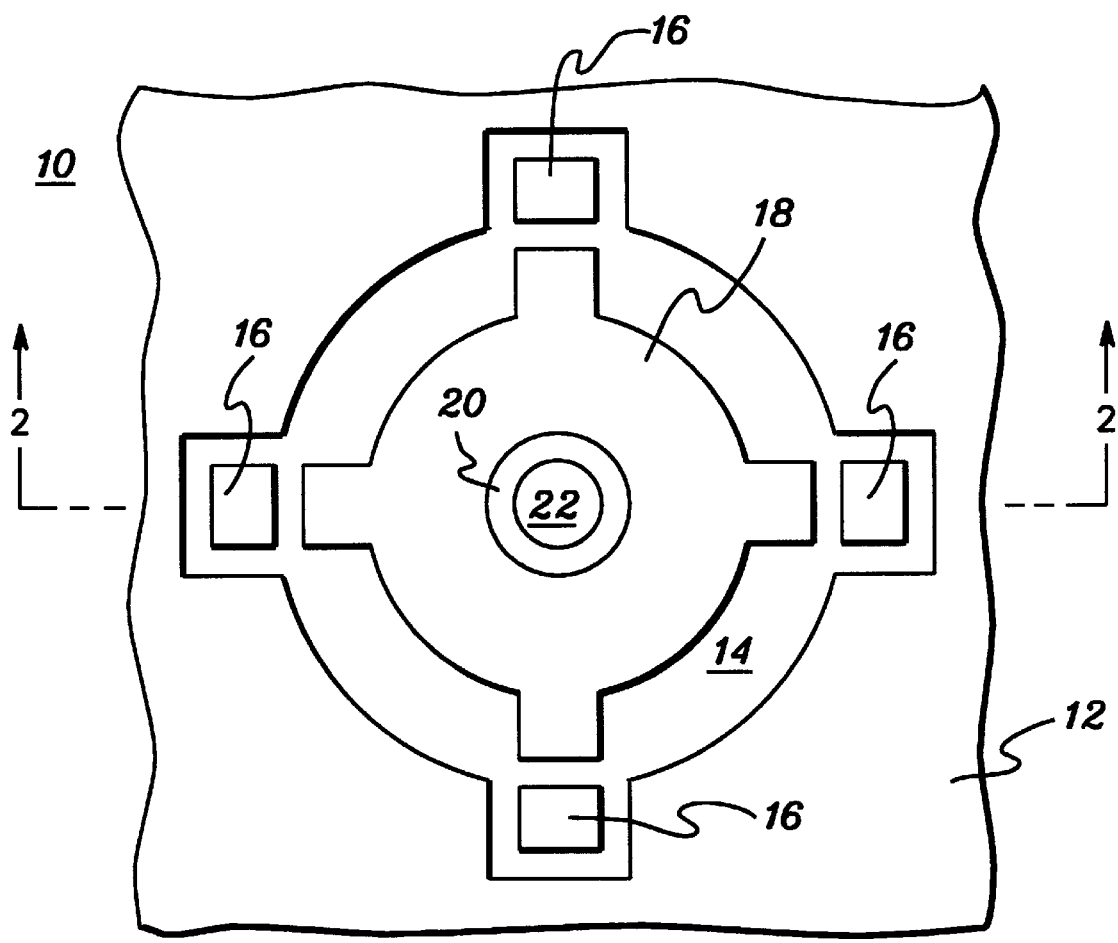
FIG. 1 is a plan view of an electrostatic micromachine layer fabricated in accordance with the present invention.
Figure 2:
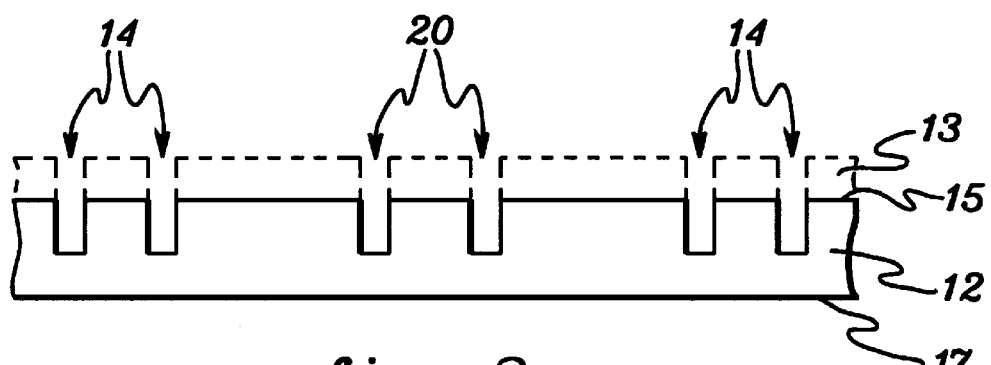
FIG. 2 is a cross-sectional view of the micromachine layer of FIG. 1 taken along lines 2—2.

FIGS. 1 & 2 present one embodiment of a micromachine layer, generally denoted 10, partially defined in a substrate 12. Layer 10 is defined by opening or trench 14 in substrate 12, patterned using a first mask 13 (shown in phantom). The micromachine layer includes stator structures 16 and a rotor structure 18. In this embodiment, mask 13 also forms a second opening 20 in the substrate which defines a hub 22 about which rotor structure 18 will eventually rotate upon the application of appropriate potentials to the stator structures 16 in a manner known in the art. Thus, micromachine layer 10 comprises an electrostatic micromotor, which is preferably defined using very-large-scale integration (VLSI) techniques. The substrate structures (16, 18, 22) defined by openings 14 & 20 are referred to herein as "microstructures" within micromachine layer 10. Note also, in this embodiment only rotor 18 will comprise a movable member within the micromachine.

As one example, substrate 12 can comprise a silicon substrate or silicon wafer oriented crystolographically so that directional wet etching may be employed to form the openings. Preferably, openings 14 & 20 are time etched at least half way through substrate 12. Thus, wet etching may be required to achieve the desired depths. Wet etching of silicon is well known in the art, e.g., reference a variation thereof in an IBM Technical Disclosure Bulletin entitled "Accelerated Etching of Silicon in Anisotropic Ethylene Diamine-Water-Pyrazine-Pyrocathecol Bath," Vol. 31, No. 7, December 1988.

Pursuant to the present invention, a sacrificial layer 24 (FIG. 3) is next conformally deposited over an upper surface 15 of substrate 12, wherein openings 14 & 20 intersect upper surface 15. After filling the openings, sacrificial layer 24 is planarized back in any appropriate way such that the sacrificial material resides only within openings 14 & 20. Appropriate sacrificial materials include material such as polyimide, paralyene, nitrides or oxides, as well as some metals and even polycrystalline materials. The material requirements are that the sacrificial material chosen should be cleanly strippable in a wet bath, while not resulting in etching of the silicon substrate or the microstructures formed therein (e.g., stator, rotor, hub). Although not shown in FIG. 1, those skilled in the art will recognize that the three sides of each stator structure 16 facing away from rotor 18 could be spaced from substrate 12 via a hard, non-removable insulator layer, which obviously would comprise a material different from the sacrificial material filling the balance of the openings.

Figure 3:
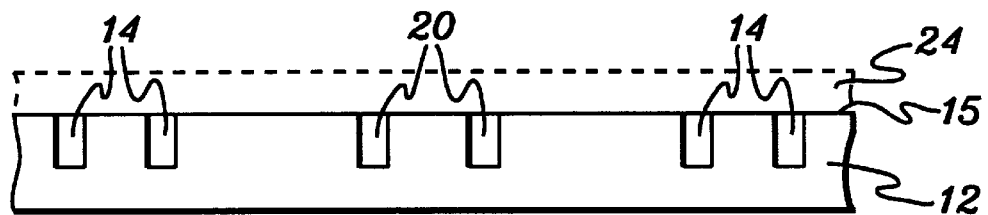
FIG. 3 is a cross-sectional view of the micromachine layer of FIG. 2 after deposition and planarization of a sacrificial material into the defined openings.
Figure 4:
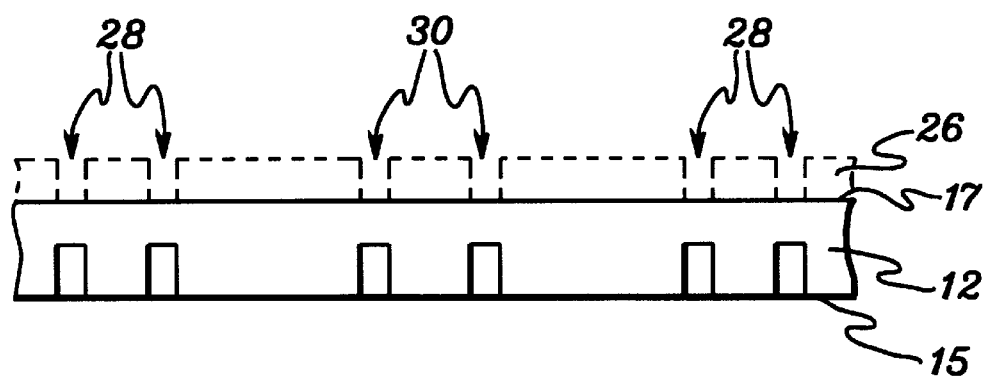
FIG. 4 is a cross-sectional view of the micromachine layer of FIG. 3, shown inverted and with a patterned mask disposed with openings in alignment with the openings already formed in the micromachine layer.
Figure 5:
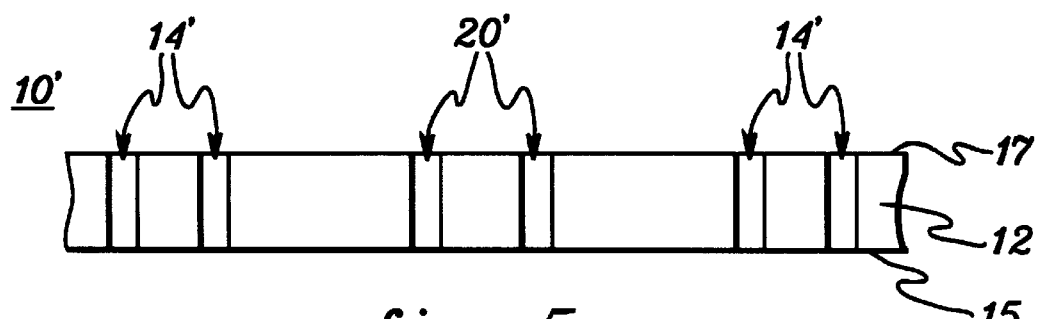
FIG. 5 is a cross-sectional view of the micromachine layer of FIG. 4 subsequent to formation of openings in the patterned surfaced thereof, and filling of those openings with a sacrificial material.

Substrate 12 is next flipped such that a lower surface 17 thereof becomes uppermost, and the processing of FIGS. 1–3 is repeated. Specifically, a second mask 26 is formed above surface 17 of substrate 12 and patterned with a first opening 28 and a second opening 30. These openings are positioned to align with the openings or trenches intersecting upper surface 15 already formed in substrate 12. Infrared light could be employed to align the openings of the second mask to those already formed in substrate 12. Etching of openings from surface 17 into substrate 12 can proceed untimed, since the filled openings therein will function as etch stops for this second etching operation. Thereafter, the openings intersecting surface 17 are filled with a sacrificial material such as used to fill the openings intersecting surface 15. The result is filled throughholes or openings 14' and 20' extending between main planar surfaces 15 & 17 of the substrate or wafer. Note that the sacrificial material disposed within these openings retains the rotor, hub and stator structures in fixed relation. Should this material be removed at this point, the hub and rotor would separate from the substrate. Also note that non-removable insulative material could have been selectively employed within openings 14' and 20' as appropriate to the machine being constructed.

Figure 6:
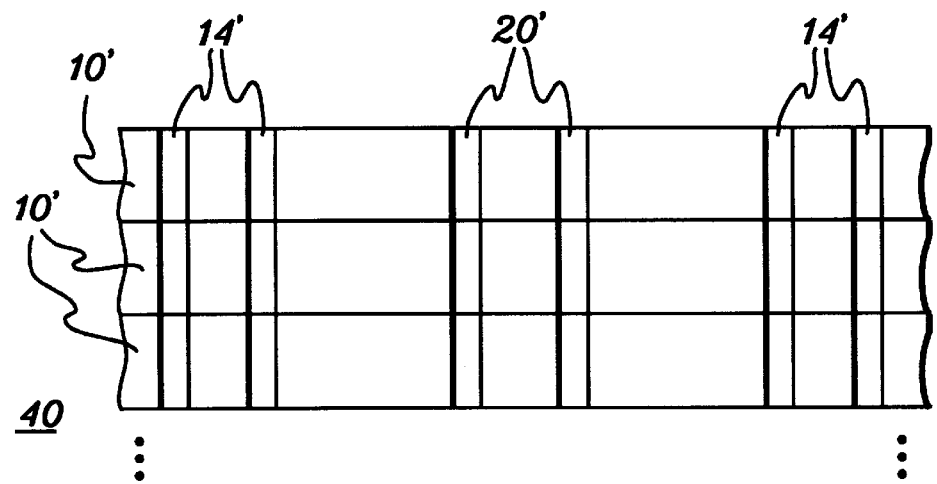
FIG. 6 is a partial cross-sectional view of a stack formed from lamination of multiple micromachine layers together, each layer comprising the structure of FIG. 5.

Referring to FIG. 6, identical micromachine layers 10' are fabricated and then laminated in a selected arrangement to form stack structure 40. As used herein, a "stack" comprises a monolithic structure wherein at least one main planar surface of each layer is laminated to a main planar surface of an adjacent layer. In this embodiment, the arrangement is such that the openings 14' & 20' through each micromachine layer in the stack align. Stacking of substrates or chips is now well known in the art; e.g., reference commonly assigned U.S. Pat. Nos. 5,202,754; 5,270,261; and 5,426,566.

During stacking, various approaches can be employed for laminating layers 10' together. For example, an adhesive material could be used only on the periphery of each layer. If the adhesive processing creates a thickness that prevents the microstructures (e.g., hub, rotor and stator structures) from contacting, then an additional mask could be employed during processing to recess the periphery of each layer by a sufficient amount to accommodate the adhesive material. Alternatively, a layer such as titanium or tungsten could be formed on the main planar surfaces of each substrate prior to formation of the openings therein so that the titanium or tungsten layer would be self-aligned to the openings once formed and could be subsequently used when the micromachine layers are being arranged in the stack structure. With titanium or tungsten layers disposed within the stack, heat treatment would cause an enhanced electrical and mechanical bonding between the aligned microstructures of the various layers in the stack.

Figure 7:
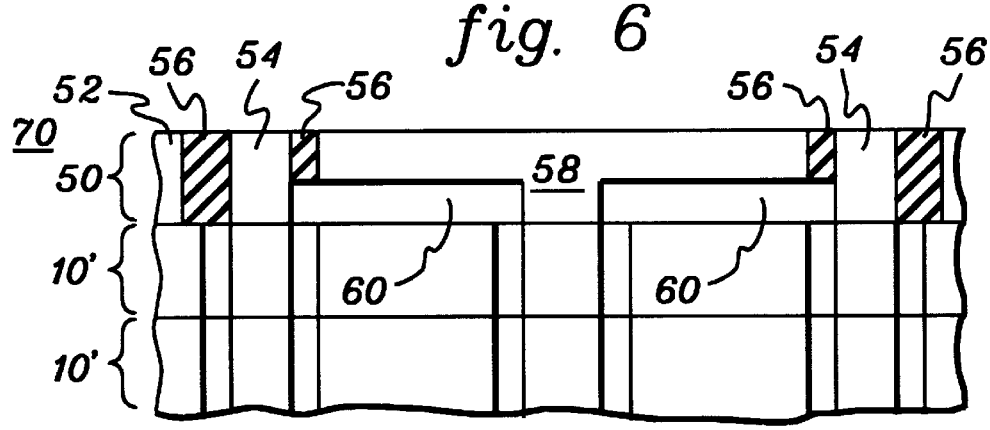
FIG. 7 is a partial cross-sectional view of a machine fabricated in accordance with the present invention from the stack of FIG. 6, shown with sacrificial material still in place.
Figure 8:
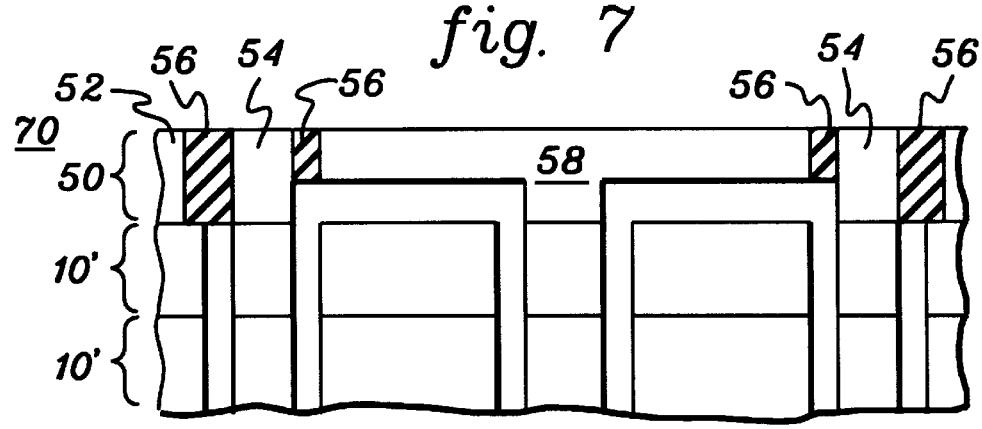
FIG. 8 is a partial cross-sectional view of the machine of FIG. 7, subsequent to removal of the sacrificial material such that the machine includes a movable member defined by multiple micromachine layers.

FIGS. 7 & 8 depict a completed machine 70 in accordance with the invention. Machine 70 employs the stack structure 40 of FIG. 6, and as shown, an endcap micromachine layer 50 as the end layer of the machine. Endcap layer 50, which would be disposed at each end of the stack, functions to retain the movable members within the machine in position. Without such a capping structure, the rotor and hub structures would simply separate from the remainder of the stack upon removal of the sacrificial materials from the openings within layers 10'. Those skilled in the art will note that chip 50 can be produced by the same or similar processes as described above in connection with micromachine layer 10'; however, the masks employed would obviously differ.

Endcap layer 50 includes hard insulators 56, such as nitride, to electrically isolate structures 54, which electrically connect to the stacked stator microstructures of micromachine layers 10'. A gap 60 is provided between the adjacent micromachine layer 10' and endcap micromachine layer 50 in the region of the rotor to allow the rotor to rotate freely without contacting the endcap layer. In this embodiment, a fixed hub structure 58 is disposed to contact the hub structure of the adjacent micromachine layer 10'. Note, however, that the hub structures may or may not be connected to the rotor structures within the micromachine layers. If the hub structures were connected to the rotor, then the configuration for endcap layer 50 would obviously vary. For example, if the hub is required to drive a mechanism external to the machine, then it would have to be attached to the rotor structures, and the endcap layer would be designated to drive an external shaft.

FIG. 8 comprises the structure of FIG. 7 after the dipping thereof into an etchant to remove the sacrificial material from the various layers. Communication with and etching of the sacrificial material would be achieved through access openings (not shown) in the endcap layer 50. Prior to final packaging, electrical signal lines would be connected to the stator structures. Also, existing VLSI techniques could be employed to provide enhancements (not shown) to the basic electrostatic motor presented herein. For example, bushings, bearings, micro-slippery-lubricants, timing devices, etc. could be added.

Although described herein with reference to an electrostatic machine, and in particular, an electrostatic motor, those skilled in the art will understand that the concepts presented are equally applicable to fabrication of a wide variety of machines having one or more movable members. For example, in an electrostatic machine, the layers which comprise a rotating member may be unconnected and thinned differently such that they rotate at different speeds, and might even be controlled to rotate in different directions if desired. Two rotor segments could do this if the stator structures were separately contacted at each end of the laminated stack and isolated near the middle. Further, if at least one stator structure is employed as a speed sensor, feedback could be used to control speed of the rotor structure. For example, the speed of rotation could be relative to a groove etched in the rotor.

Conceptually, the invention employs a series of masks to define layers or slices on a substrate or wafer to be subsequently assembled in a selected arrangement to form a stack and thus, the machine. Sacrificial layers temporarily hold the movable member(s) within the layers until stacking is achieved. By fabricating a machine as a stack, machines with dimensions from micrometers to millimeters to centimeters can be achieved. Essentially, the concepts presented allow the fabrication of machines sized to fill the pre-existing gap between macro (centimeters) and micro sized machines.

Again, a wide variety of machines can be constructed using the techniques presented herein. For example, the individual layers of the stack may each contain different micromachine structures, or if containing the same structures, those structures may be the sized and/or shaped differently. For example, a pear-shaped rotor could be readily envisioned and constructed using the layering approach presented herein. There are few limits on what can be done employing the basic concepts of the invention presented.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

We claim:

1. An electrostatic machine comprising:
   a monolithic structure comprising a plurality of separately formed slices laminated together in a stack, at least some slices of said plurality of slices laminated together in the stack comprising identically-structured slices, said monolithic structure having
   a stator structure, and
   a movable member positioned for movement relative to the stator structure, free of contact therewith, said movable member and a fixed portion adjacent thereto being defined from microstructure of at least one micromachine slice comprising a slice of said plurality of slices.

2. The electrostatic machine of claim 1, wherein said stator structure and said movable member are each defined from microstructure of multiple micromachine slices, each micromachine slice comprising a slice of said plurality of slices.

3. The electrostatic machine of claim 1, wherein said plurality of slices includes two endcap slices, each endcap slice being disposed at a different end of said monolithic structure, said endcap slices being configured to retain said movable member within said monolithic structure.

4. The electrostatic machine of claim 3, wherein said electrostatic machine comprises an electrostatic motor and wherein said movable member comprises a rotor, said rotor comprising multiple slices of said plurality of slices laminated together in the stack.

5. The electrostatic machine of claim 4, wherein said monolithic structure further comprises a hub about which said rotor rotates, said hub being at least partially defined by said multiple slices comprising said rotor.

6. The electrostatic machine of claim 4, wherein said monolithic structure further comprises a hub connected to said rotor so as to rotate therewith, and wherein at least one endcap slice of said two endcap slices includes a movable structure connected to said hub so as to rotate therewith and drive a structure external to the electrostatic machine.

7. The electrostatic machine of claim 4, wherein at least one endcap slice of said two endcap slices includes an electrical contact to said stator structure.

8. The electrostatic machine of claim 1, wherein said movable member is defined from microstructure of at least two micromachine slices which comprise slices of said plurality of slices, said microstructure of said at least two micromachine slices being unconnected.

9. The electrostatic machine of claim 1, wherein at least some slices of said plurality of slices each comprise a silicon substrate.

10. A machine comprising a stack structure of a plurality of separately formed slices laminated together, said stack structure including a movable member and a fixed portion adjacent thereto defined from microstructure of at least one slice of said plurality of slices, at least some slices of said plurality of slices comprising identically-structured slices.

11. The machine of claim 10, wherein said at least one slice comprises multiple slices of said plurality of slices, each slice of said multiple slices comprising a micromachine slice, each micromachine slice being adjacently disposed within said stack structure so as to define said movable member, wherein said multiple micromachine slices define said moveable member and comprise said identically-structured slices.

12. The machine of claim 10, wherein said at least some slices comprising said identically-structured slices are adjacently disposed within said stack and are laminated together to at least partially define said machine.

13. The machine of claim 10, wherein at least two slices of said plurality of slices are differently structured.

14. The machine of claim 10, wherein each slice of said plurality of slices at least partially comprises stationary structure.

15. The machine of claim 10, wherein each slice of said plurality of slices comprises a silicon substrate.

* * * * *